United States Patent
Wang et al.

(10) Patent No.: US 9,858,920 B2
(45) Date of Patent: Jan. 2, 2018

(54) ADAPTATION METHODS AND SYSTEMS FOR SPEECH SYSTEMS

(71) Applicant: GM GLOBAL TECHNOLOGY OPERATIONS LLC, Detroit, MI (US)

(72) Inventors: Peggy Wang, Shanghai (CN); Ute Winter, Petach Tiqwa (IL); Timothy J. Grost, Clarkston, MI (US); Matthew M. Highstrom, South Lyon, MI (US)

(*) Notice: Subject to any disclaimer, the term of this patent is extended or adjusted under 35 U.S.C. 154(b) by 125 days.

(21) Appl. No.: 14/320,122

(22) Filed: Jun. 30, 2014

(65) Prior Publication Data

US 2015/0379985 A1 Dec. 31, 2015

(51) Int. Cl.
| | | |
|---|---|---|
| G10L 15/00 | (2013.01) | |
| G10L 15/07 | (2013.01) | |
| G10L 17/00 | (2013.01) | |
| G10L 15/22 | (2006.01) | |
| G10L 25/03 | (2013.01) | |

(52) U.S. Cl.
CPC ............ G10L 15/07 (2013.01); G10L 25/03 (2013.01); *G10L 2015/227* (2013.01)

(58) Field of Classification Search
CPC ......... G10L 15/07; G10L 15/20; G10L 15/22; G10L 17/04; G10L 25/93; G10L 2015/227
USPC ........ 704/226, 231, 243, 246, 250, 251, 255, 704/275
See application file for complete search history.

(56) References Cited

U.S. PATENT DOCUMENTS

| | | | | |
|---|---|---|---|---|
| 2009/0248419 A1* | 10/2009 | Spaulding | ............... | G10L 21/10 704/275 |
| 2014/0350918 A1* | 11/2014 | Liu | ......................... | G06F 17/24 704/9 |
| 2015/0371663 A1* | 12/2015 | Gustafson | ............. | G10L 15/265 704/270.1 |

FOREIGN PATENT DOCUMENTS

EP        1020847 A2 *  7/2000   ............. G10L 15/08

* cited by examiner

*Primary Examiner* — Thierry L Pham
(74) *Attorney, Agent, or Firm* — Lorenz & Kopf, LLP

(57) ABSTRACT

Adaptation methods and systems are provided for a speech system of a vehicle. In one embodiment a method comprises: receiving speech data; determining a speech pace based on the speech data; determining a user model based on the speech pace; and generating adaptation parameters for at least one of a speech recognition system and a dialog manager based on the user model.

19 Claims, 4 Drawing Sheets

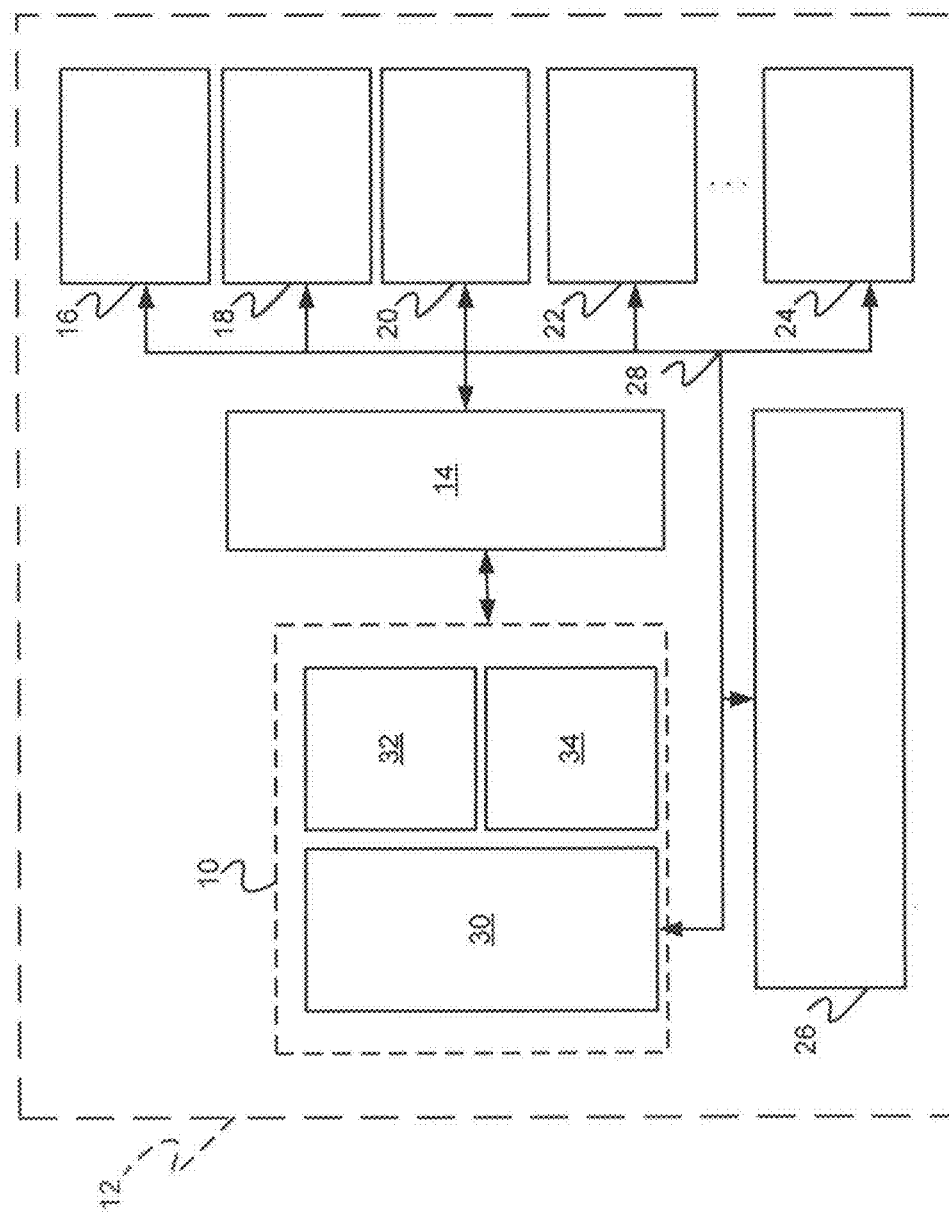

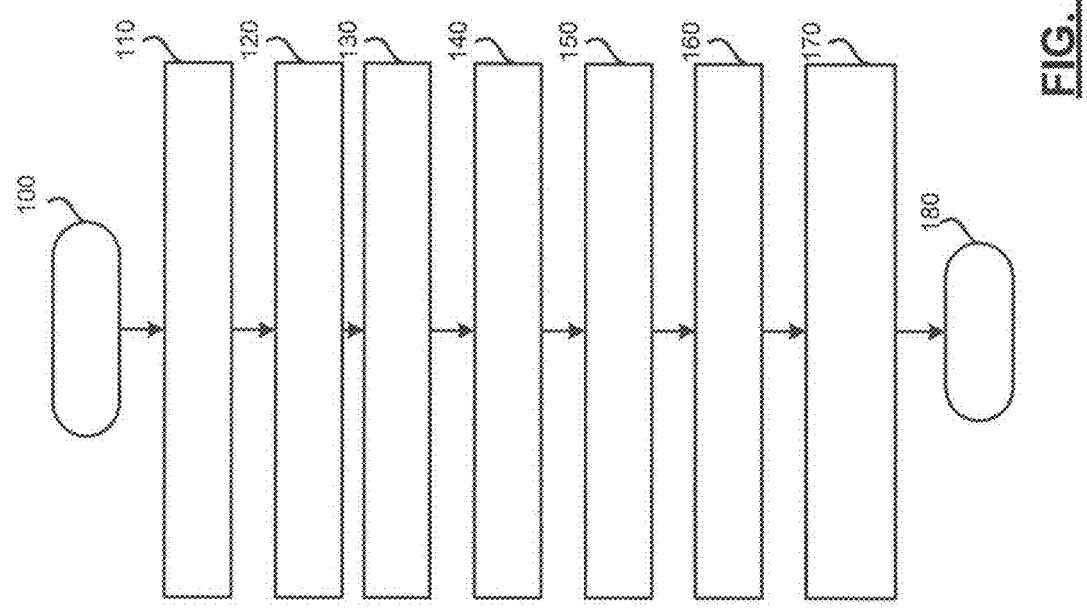

9,858,920 B2

ADAPTATION METHODS AND SYSTEMS FOR SPEECH SYSTEMS

TECHNICAL FIELD

The technical field generally relates to speech systems, and more particularly relates to methods and systems for adapting speech systems, and more particularly to methods and systems for adapting speech systems based on a dialog pace.

BACKGROUND

Vehicle speech systems perform speech recognition on speech uttered by an occupant of the vehicle. The speech utterances typically include commands that control one or more features of the vehicle or other systems accessible by the vehicle. Speech systems manage a dialog with a user of the vehicle based on the commands. The dialog is typically generic for all users. Not all users communicate with a speech system in the same manner. In addition, the same user may not communicate with the speech system in the same manner every time. For example, certain contextual conditions may influence the user's ability to speak the command.

Accordingly, it is desirable to provide methods and systems for adapting a vehicle speech system. Furthermore, other desirable features and characteristics of the present invention will become apparent from the subsequent detailed description and the appended claims, taken in conjunction with the accompanying drawings and the foregoing technical field and background.

SUMMARY

Adaptation methods and systems are provided for a speech system of a vehicle. In one embodiment, a method comprises: receiving speech data; determining a speech pace based on the speech data; determining a user model based on the speech pace; and generating adaptation parameters for at least one of a speech recognition system and a dialog manager based on the user model.

In one embodiment, a system includes a first module that receives speech data and determines a speech pace based on the speech data. The system further includes a second module that determines a user model based on the speech pace. The system further includes a third module that generates adaptation parameters for at least one of a speech recognition system and a dialog manager based on the user model.

DESCRIPTION OF THE DRAWINGS

The exemplary embodiments will hereinafter be described in conjunction with the following drawing figures, wherein like numerals denote like elements, and wherein:

FIG. 1 is a functional block diagram of a vehicle that includes a speech system in accordance with various exemplary embodiments;

FIG. 4 is a flowchart illustrating adaptation methods that may be performed by the speech system in accordance with various exemplary embodiments.

DETAILED DESCRIPTION

Figure 2A:
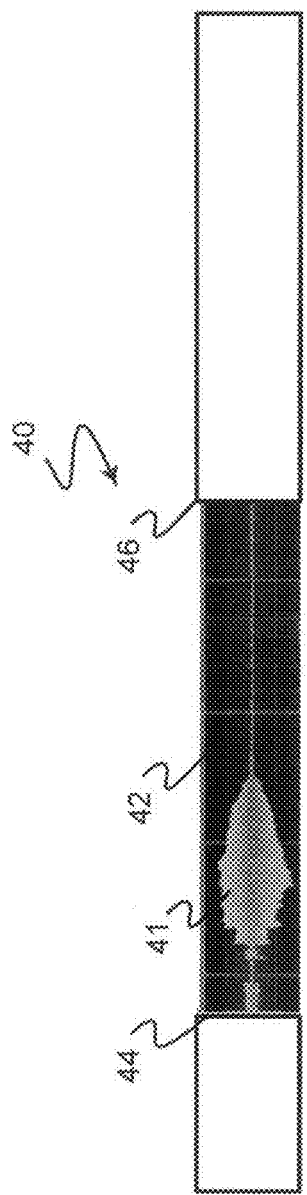
FIGS. 2A and 2B are illustrations of recorded speech data of the speech system in accordance with exemplary embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

With initial reference to FIG. 1, in accordance with exemplary embodiments of the present disclosure, a speech system 10 is shown to be included within a vehicle 12. The speech system 10 provides speech recognition and a dialog for one or more vehicle systems through a human machine interface module (HMI) module 14. Such vehicle systems may include, for example, but are not limited to, a phone system 16, a navigation system 18, a media system 20, a telematics system 22, a network system 24, or any other vehicle system that may include a speech dependent application. As can be appreciated, one or more embodiments of the speech system 10 can be applicable to other non-vehicle systems having speech dependent applications and thus, is not limited to the present vehicle example. For exemplary purposes, the speech system 10 will be discussed in the context of the vehicle example.

The speech system 10 communicates with the multiple vehicle systems 16-24 and/or other vehicle systems 26 through the HMI module 14 and a communication bus and/or other communication means 28 (e.g., wired, short range wireless, or long range wireless). The communication bus can be, for example, but is not limited to, a CAN bus.

Generally speaking, the speech system 10 includes an automatic speech recognition (ASR) module 30, a dialog manager module 32, and an adaptation module 34. As can be appreciated, the ASR module 30, the dialog manager module 32, and the adaptation module 34 may be implemented as separate systems and/or as a combined system as shown. As can further be appreciated, the modules of the speech system 10 can be implemented all on the vehicle 12, or part on the vehicle 12 and part on a remote system such as a remote server (not shown).

In general, the ASR module 30 receives and processes data including speech utterances recorded by the HMI module 14. Some recognized commands (e.g., based on a confidence threshold) from the speech utterance are sent to the dialog manager module 32. The dialog manager module 32 manages an interaction sequence and prompts based on the command.

Figure 2B:
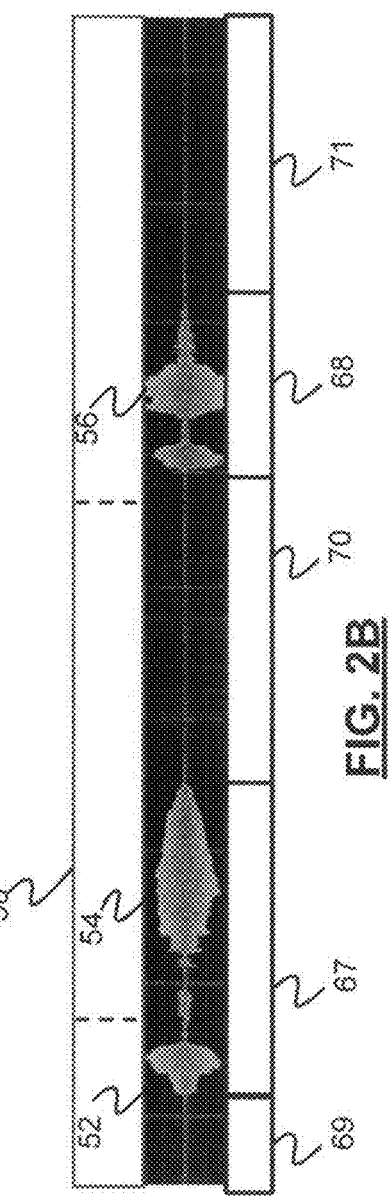

In accordance with various embodiments of the present disclosure, the ASR module 30 receives a second set of data that includes speech utterances recorded by the HMI module 14. The second set of data includes data that has been recorded for a longer period of time than the first set of data. For example, as shown in FIG. 2A, a first set of data 40 includes data 41 recorded during a recording window 42 that begins once the prompt has completed at 44 and that ends at 46 at a predetermined time after the recording began. As shown in FIG. 2B, the second set of data 48 includes data recorded during a second recording window 50 that is greater than the first recording window 42 (FIG. 2A) that includes data 52 recorded before the recording window 42 (FIG. 2A) (e.g., a predetermined time before the recording window 42 (FIG. 2A), for example, during the speech prompt), data 54 recorded during the recording window 42 (FIG. 2A), and data 56 recorded after the recording window 42 (FIG. 2A) (e.g., a predetermined time after the recording window 42, for example, during speech processing or a subsequent speech prompt).

With reference back to FIG. 1, the ASR module 30 provides the second set of data 48 to the adaptation module 34. The adaptation module 34 processes the data 48, with data from the various vehicle systems 16-24, and/or data from the various other vehicle systems 26 (e.g., that do not include speech applications). The adaptation module 34 processes the data to determine a pace and to learn a context in which the pace was spoken. Based on the pace and the context, the adaptation module 34 determines adaptation parameters that are used to adapt at least one of the dialog and the speech recognition performed by the ASR module 30 and/or the dialog manager module 32.

As can be appreciated, all or parts of the processing by the adaptation module 34 can be performed in realtime, can be performed partially in realtime and partially offline, or can be performed completely offline. As can further be appreciated, the adaptation module 34 can be implemented onboard the vehicle 12, partially onboard the vehicle 12 and partially on the remote server, or completely on the remote server.

Figure 3:
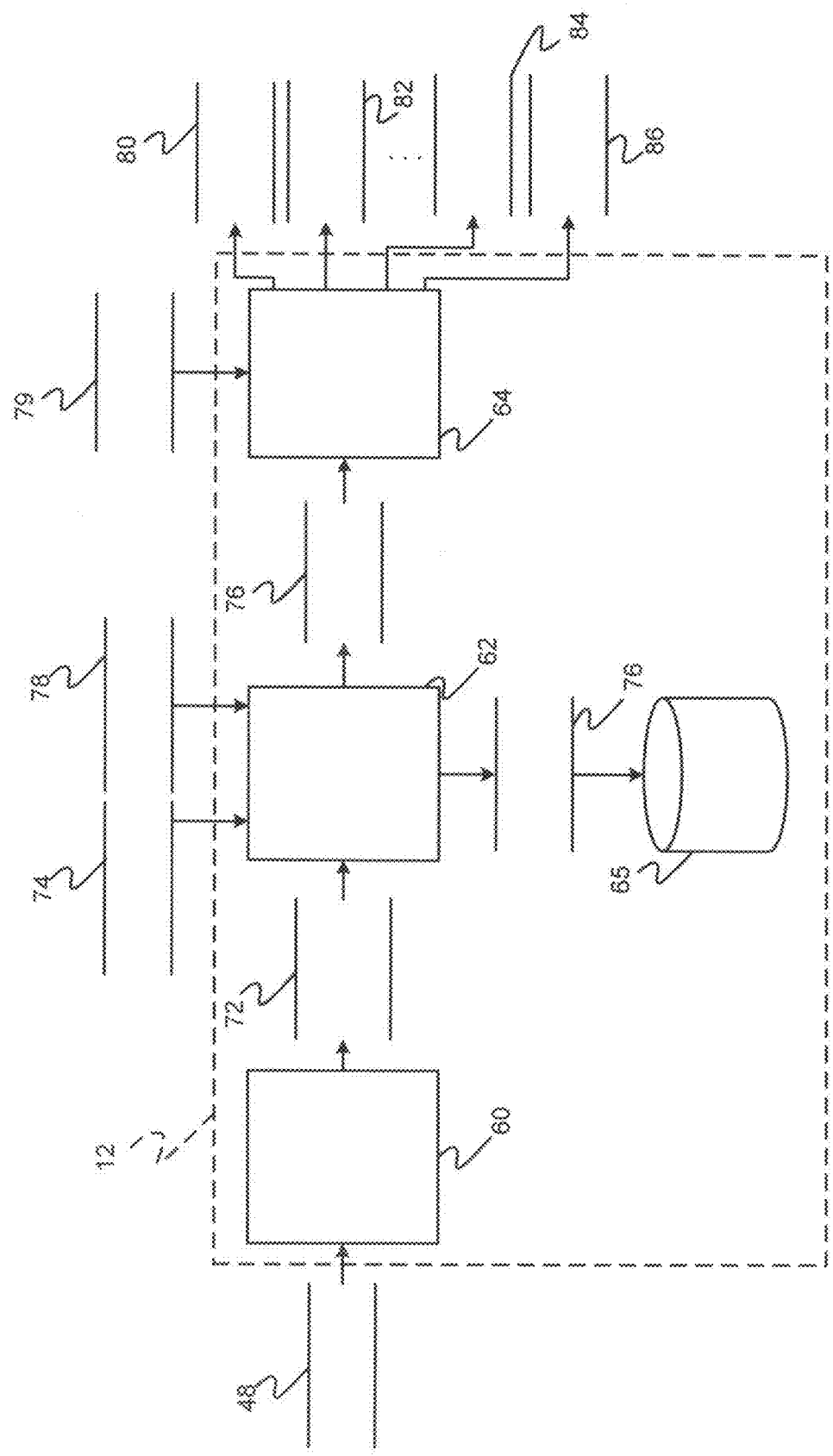
FIG. 3 is a dataflow diagram illustrating an adaptation module of the speech system in accordance with various exemplary embodiments.

Referring now to FIG. 3 and with continued reference to FIGS. 1, 2A, and 2B, a dataflow diagram illustrates the adaptation module 34 in accordance with various embodiments. As can be appreciated, various embodiments of adaptation modules 34, according to the present disclosure, may include any number of sub-modules. For example, the sub-modules shown in FIG. 3 may be combined and/or further partitioned to similarly determine a user's pace and to determine adaptation parameters. In various exemplary embodiments, the adaptation module 34 includes a pace determination module 60, a user model determination module 62, an adaptation parameters determination module 64, and a user model datastore 65.

The pace determination module 60 receives as input the second set of speech data 48. The pace determination module 60 processes the second set of data 48 to define a pace of the speech. For example, as shown in FIG. 2B, the pace determination module divides the speech data into speech sections 67, 68 and non-speech sections 69-71. The pace determination module 60 divides the speech data by detecting a start and an end of speech.

With reference back to FIG. 3, based on the sections 67-71, the pace determination module 60 determines a pace 72 of the speech. The pace determination module 60 determines the pace 72 based on time frames after the end of the prompt and before the start of the user speech, speech pause lengths during and after the speech, speech pause lengths before the next prompt of the speech system, and/or time frames from speech overlap between system prompts and user speech. The pace determination module 60 determines and tags the time frames with an identifier of the type of time frame, such as pause between speech sections, barge-in overlap in the end of prompt, start speech after prompt, etc.

In addition, the pace determination module 60 can determine timing indicating average, minimum, and/or maximum pause times from the current speech data 48 and/or previous speech data 48. These parameters can be used to define the pace 72. For example, pace determination module 60 determines an average time frame, which a user takes to start speaking after the system prompt ends.

The user model determination module 62 receives as input the pace 72 and a user identifier 74. The user identifier 74 may be, for example, based on a use of a certain key fob, identified by the presence of an electronic device in the vehicle 12, or based on any other method. The user model determination module 62 creates a user model 76 by associating the parameters of the pace 72 with the identifier of the user 74 and storing the associated values as a user model 76 in the user mode datastore 65.

Additionally, or alternatively, the user model determination module 62 receives as input context data 78. The context data 78 may be determined or sensed by one or more components or sensors of the vehicle 12 and communicated to the adaptation module 62. In various embodiments, the context data 78 may include, but is not limited to, user attention data received from an eye tracking system, vehicle environment data received from a vehicle safety system, vehicle maneuver data received from the communication bus or other control module of the vehicle, navigation data received from a navigation system, and weather data received from a satellite system.

The user model determination module 62 associates the context data 78 with the pace 72 and stores the values as part of the user model 76. In various embodiments, the user model determination module 62 associates the context data 78 with the user model 76 based on a timing of the occurrence of the speech and/or the context.

The adaptation parameters determination module 64 receives as input the user model 76. The adaptation parameters determination module 64 may further receive as input current context data 79. The context data 79 may be determined or sensed by one or more components or sensors of the vehicle and communicated to the adaptation module 64. In various embodiments, the current context data 79 may similarly include, but is not limited to, user attention data received from an eye tracking system, vehicle environment data received from a vehicle safety system, vehicle maneuver data received from the communication bus or other control module of the vehicle, navigation data received from a navigation system, weather data received from a satellite system, and passenger data indicating interaction between the passengers received from a passenger tracking system. The adaptation parameters determination module 64 determines from the current context data 79 a level of certainty of the user, a level of uncertainty of the user, and/or a contextual distraction is occurring. Based on the determination, the adaptation parameters determination module 64 determines which adaptation parameters would be most helpful to the user.

For example, if the system's time-out parameter is not sufficiently longer than the determined average time which a user needs to start speaking after the system prompt ends, the time-out parameter is adjusted. The time-out parameter can be adjusted per dialog step. For example, some steps within a dialog may need longer time to be answered, for instance, when the user is selecting from a list of options, and needs time to review the list to pick a best choice. In another example, if the system's time-out parameter is not sufficiently longer than the average pause time between speech sections, the user may be cut off by the speech system, because it determines end of speech instead of a pause. In this case, the time-out parameter is adjusted to give time to determine the user's end of speech.

In various embodiments, the adaptation parameters determination module 64 determines the adaptation parameters associated with the level of certainty, the level of uncertainty, and the contextual distraction based on a user model 76. For example, the level of certainty may be with respect to the way the user utters a request. For instance, if a user repeatedly looks at the screen and waits with an answer, the user may not know how to proceed in the dialog, either because the user does not sufficiently know the system's capabilities at this point of the dialog, or the user cannot decide what he wants and is thinking about a choice or trying to understand what is available from a screen.

Depending on the scenario, the adaptation parameters determination module 64 determines the adaptation parameters 80-86 that will at least one of adapt a dialog pace, adapt dialog prompts, adapt a recording window, and adapt speech recognition. The adaptation parameters determination module 64 sends the adaptation parameters 80-86 to at least one of the dialog manager module 32 (FIG. 1) and the ASR module 30 (FIG. 1) or adapting the dialog and/or speech recognition methods.

In various embodiments, the adaptation parameters determination module 64 determines adaptation parameters 80-86 that adjust the recording window. For example, the adaptation parameters 80 may adjust a start time of the recording window to start earlier and/or may adjust an end time of the recording window to end later based on the determined pace 72. In the various embodiments, the adaptation parameters 80 may be context dependent, that is, specific to a particular context of the vehicle, and/or may be general parameters that are used in all contexts.

In various embodiments, the adaptation parameters determination module 64 determines adaptation parameters 82 that adjust the pace of the dialog. For example, the adaptation parameters 82 may adjust a timing of a delivery of the system prompts. This can be done to accommodate the inherent dialog pace of the user. For example, if a user does not like to be rushed by the system, a prompt may be started a little later to have a slower dialog pace. If a user is more familiar with the system and speaks at a faster pace, the system prompt may be started as soon as possible after the user finishes speaking.

In the various embodiments, the adaptation parameters 82 may be context dependent, that is, specific to a particular context of the vehicle, and/or may be general parameters that are used in all contexts. For example, when a particular driving maneuver is detected from the current context data, the adaptation parameters 82 may adjust the timing such that a next prompt waits until the driving maneuver is over, and then a subsequent prompt is delivered to remind a user that the system is still listening.

In various embodiments, the adaptation parameters determination module 64 determines adaptation parameters 84 that adjust the dialog prompts. For example, the adaptation parameters 84 may indicate to select prompts that inform the user about the system limitations and/or provide suggestions for modifying the command delivery to avoid recognition errors. For example, the adaptation parameters determination module 64 may determine that the user's utterance delivery style is inconsistent with optimal speech recognition, and system parameter adjustment may not be the best way to eliminate the inconsistency. In this case, the adaptation parameters determination module 64 adjusts the dialog prompts such that feedback is provided to the user with guidance on how to adjust their utterance style and improve overall system interaction. For example, a user may feel, in error, that if they speak the digits of a phone number very slowly, with pauses between each digit, that the system will understand them better. This delivery style is not only bad for speech recognition, but is also a burden on the user speaking the utterances. A prompt coaching the user to speak in a natural cadence would ease this problem and the user's burden in providing the utterance.

In various embodiments, the adaptation parameters determination module 64 determines adaptation parameters 86 that adjust the recognition methods. For example, the adaptation parameters 86 may indicate to reprocess the speech utterance using the second set of speech data or by providing a modified speech data that includes the speech sections of the speech data and/or the speech sections with reduced non-speech sections.

Referring now to FIG. 4 and with continued reference to FIGS. 1-3, a flowchart illustrates a method that may be performed by the adaptation module 34 in accordance with various embodiments. As can be appreciated in light of the disclosure, the order of operation within the methods is not limited to the sequential execution as illustrated in FIG. 4, but may be performed in one or more varying orders as applicable and in accordance with the present disclosure. As can further be appreciated, one or more steps of the methods may be added or removed without altering the spirit of the method.

In one example, the method may begin at 100. The second set of speech data 48 including data recorded during a longer recording window is received at 110. Context data 78 associated with the timing of the recorded speech data is received at 120. The speech pace 72 is determined based on the speech data 48 at 130. The user model 76 is created and stored based on the speech pace 72 at 140. The current context data 78 is received at 150. The adaptation parameters 80-86 are determined based on the user model 76 and the current context data 78 at 160. At least one of the recording window, the dialog pace, the dialog prompts, and the speech processing is adapted using the adaptation parameters 80-86 at 170. Thereafter, the method may end at 180.

As can be appreciated, although the steps of the method are shown to be performed sequentially, time may lapse between execution of the various steps in various embodiments. For example steps 110-140 may be executed a number of times to establish a number of user models 76 or a number of values for a single user model 76, before the current context data 78 is received and adaptation parameters 80-86 are determined.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An adaptation method for a speech system of a vehicle, comprising:
   receiving, by a processor, a first set of speech data recorded during a defined speech window, wherein the defined speech window begins once a system prompt has completed and ends at a predetermined time after the defined speech window begins;

receiving, by a processor, a second set of speech data, wherein the second set of speech data comprises data recorded during the defined speech window and at least one of data recorded before the defined speech window and data recorded after the defined speech window;

determining, by the processor, a speech pace based on the second set of speech data;

determining, by the processor, a user model based on the speech pace; and generating, by the processor, adaptation parameters for processing the first set of speech data by at least one of a speech recognition system and a dialog manager based on the user model.

2. The method of claim 1, wherein the determining the speech pace comprises dividing the speech data into speech sections and non-speech sections and wherein the determining the speech pace is based on a timing of the speech sections and the non-speech sections.

3. The method of claim 1, wherein the determining the user model comprises associating the speech pace with a user identifier.

4. The method of claim 1, wherein the determining the user model further comprises associating context data with the speech pace.

5. The method of claim 4, wherein the context data comprises at least one of user attention data, vehicle environment data, vehicle maneuver data, navigation data, and weather data.

6. The method of claim 1, wherein the generating the adaptation parameters comprises generating adaptation parameters that adapt a dialog pace of the dialog manager.

7. The method of claim 1, wherein the generating the adaptation parameters comprises generating adaptation parameters that adapt dialog prompts of the dialog manager.

8. The method of claim 1, wherein the generating the adaptation parameters comprises generating adaptation parameters that adapt a recording window of the speech recognition system.

9. The method of claim 1, wherein the generating the adaptation parameters comprises generating adaptation parameters that adapt speech recognition of the speech recognition system.

10. An adaptation system for a speech system of a vehicle, comprising:

a non-transitory computer readable medium, comprising:

a first module that, by a processor, receives a first set of speech data, receives a second set of speech data and determines a speech pace based on the speech data wherein the speech data comprises data recorded during the defined speech window and at least one of data recorded before the defined speech window and data recorded after the defined speech window, wherein the defined speech window begins once a system prompt has completed and ends at a predetermined time after the defined speech window begins;

a second module that, by a processor, determines a user model based on the speech pace; and a third module that, by a processor, generates adaptation parameters for processing the first set of speech data by at least one of a speech recognition system and a dialog manager based on the user model.

11. The system of claim 10, wherein the first module determines the speech pace by dividing the speech data into speech sections and non-speech sections and determines the speech pace based on a timing of the speech sections and the non-speech sections.

12. The system of claim 10, wherein the second module determines the user model by associating the speech pace with a user identifier.

13. The system of claim 10, wherein the second module determines the user model by associating context data with the speech pace.

14. The system of claim 13, wherein the context data comprises at least one of user attention data, vehicle environment data, vehicle maneuver data, navigation data, and weather data.

15. The system of claim 10, wherein the third module generates the adaptation parameters by generating adaptation parameters that adapt a dialog pace of the dialog manager.

16. The system of claim 10, wherein the third module generates the adaptation parameters by generating adaptation parameters that adapt dialog prompts of the dialog manager.

17. The system of claim 10, wherein the third module generates the adaptation parameters by generating adaptation parameters that adapt a recording window of the speech recognition system.

18. The system of claim 10, wherein the third module generates the adaptation parameters by generating adaptation parameters that adapt speech recognition of the speech recognition system.

19. The method of claim 1, further comprising processing, by the processor, processing the first set of speech data using the adaptation parameters by at least one of a speech recognition system and a dialog manager.

* * * * *